(12) United States Patent
Nishiuchi et al.

(10) Patent No.: US 7,251,202 B2
(45) Date of Patent: Jul. 31, 2007

(54) SUBSTRATE FOR OPTICAL RECORDING MEDIUM, OPTICAL RECORDING MEDIUM, MASTER DISC, MASTER DISC RECORDING APPARATUS, AND SIGNAL GENERATING APPARATUS

(75) Inventors: Kenichi Nishiuchi, Hirakata (JP); Shigeaki Furukawa, Kadoma (JP); Tetsuya Akiyama, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 536 days.

(21) Appl. No.: 10/633,813

(22) Filed: Aug. 4, 2003

(65) Prior Publication Data
US 2004/0027950 A1 Feb. 12, 2004

Related U.S. Application Data

(62) Division of application No. 09/702,204, filed on Oct. 31, 2000, now Pat. No. 6,661,749.

(30) Foreign Application Priority Data
Nov. 1, 1999 (JP) ............................ 11-311489

(51) Int. Cl.
*G11B 7/00* (2006.01)

(52) U.S. Cl. ............................ 369/44.13; 369/13.35; 369/30.1; 369/275.1; 369/275.3

(58) Field of Classification Search ............ 369/13.55, 369/44.13, 30.1, 30.12, 275.1, 275.3, 47.51, 369/44.26, 44.41, 275.4
See application file for complete search history.

(56) References Cited

U.S. PATENT DOCUMENTS

| | | | |
|---|---|---|---|
| 5,796,543 A | 8/1998 | Ton-That | |
| 5,933,411 A | 8/1999 | Inui et al. | |
| 6,064,643 A | 5/2000 | Tanoue et al. | |
| 6,091,699 A | 7/2000 | Nakane et al. | |
| 6,091,700 A | 7/2000 | Kobayashi | |
| 6,118,752 A | 9/2000 | Miyagawa et al. | |
| 6,172,960 B1 | 1/2001 | Takemura et al. | |
| 6,343,062 B1 | 1/2002 | Furukawa et al. | |
| 6,381,201 B1 * | 4/2002 | Shihara et al. | 369/32.01 |
| 6,567,372 B2 * | 5/2003 | Takamine et al. | 369/275.4 |
| 6,661,749 B1 * | 12/2003 | Nishiuchi et al. | 369/44.13 |

* cited by examiner

*Primary Examiner*—Andrea Wellington
*Assistant Examiner*—Kim-Kwok Chu
(74) *Attorney, Agent, or Firm*—RatnerPrestia

(57) ABSTRACT

A substrate for an optical recording medium includes recording tracks formed in guide grooves on a disc and an address section having an address pit sequence formed between the recording tracks in the guide grooves along an information reading direction of the recording tracks. The recording tracks in the guide grooves are divided into a prescribed number of zones. In each of the zones, the center of the address section corresponding to a recording track in the radially outermost or radially innermost guide groove is disposed so as to shift in a radial direction of the disc in relative relationship to the center of the recording track in the guide groove.

13 Claims, 11 Drawing Sheets

SUBSTRATE FOR OPTICAL RECORDING MEDIUM, OPTICAL RECORDING MEDIUM, MASTER DISC, MASTER DISC RECORDING APPARATUS, AND SIGNAL GENERATING APPARATUS

THIS IS A DIVISIONAL APPLICATION OF U.S. application Ser. No. 09/702,204 FILED Oct. 31, 2000 now U.S. Pat. No. 6,661,749.

BACKGROUND OF THE INVENTION

1. Field of the Invention

The present invention relates to an optical recording medium for recording and reproducing information thereon by radiation of a laser light or the like; the invention further relates to a substrate for such an optical recording medium, a master disc, a master disc recording apparatus, and a signal generating apparatus used in the same.

2. Related Art of the Invention

Optical recording media are attracting attention as large capacity, high density memories, and the development of rewritable media called the erasable type has been proceeding. One of the erasable optical recording media is the phase change optical disc which has, on a disc-shaped transparent substrate, a recording layer made of a thin film that exhibits a phase change between an amorphous state and a crystalline state, and on which information is recorded and recorded information erased utilizing the heat energy generated by radiation of a laser light.

The production process for the phase change optical disc comprises (1) a film deposition step in which a phase change type recording layer is formed by sputtering or other technique on a transparent substrate having on its surface a guide groove formed from raised and recessed portions, (2) a laminating step in which a protective plate for protecting the recording thin film is laminated on the recording layer, and (3) an initializing step in which initialization is performed to change the state of the recording layer from the amorphous to the crystalline state. As phase change materials for the recording layer, alloy films composed principally of Ge, Sb, Te, In, etc., for example, a GeSbTe alloy, are known in the art.

Generally, information is recorded by forming a mark by locally amorphizing the recording layer, and erasure is done by crystallizing this amorphous mark. Amorphization is accomplished by heating the recording layer above its melting point and then cooling it at a rate faster than a prescribed value. On the other hand, crystallization is done by heating the recording layer to a temperature equal to or higher than its crystallizing temperature but equal to or lower than its melting point.

In general, a spiral or concentric guide grooves for guiding a laser beam during recording and reproduction, and address information (hereinafter sometimes called the address for short) consisting of address pits formed from raised and recessed portions indicating a position on the medium, are provided in advance on the substrate.

Further, the address information is formed in the arrangement called the ZCAV or ZCLV format, and each track is divided into a plurality of recording sectors by address sections formed from address pits. The number of sectors per revolution differs from zone to zone arranged in the radial direction. More specifically, the number of sectors gradually increases toward the outer diameter of the medium. In the same zone, the number of sectors per revolution is the same. Further, the number of zones depends on sector length, and decreases with increasing sector length.

With increasing processing capabilities of information apparatuses in recent years, the amount of information they handle have been increasing. There is thus a need for recording media capable of recording and reproducing larger amounts of information. As a means of increasing the capacity, DVD-RAM, for example, employs a method that uses both the raised and recessed portions of the guide groove as information tracks, thereby increasing the track density. In this case, each groove track and land track are formed approximately equal in width.

In the method employed in this recording medium, address information is provided between the groove track and land track so that one address section is shared between each adjacent groove track and land track pair. The address section recorded between the adjacent groove track and land track is called the "intermediate address".

FIG. 11 is a diagram showing the format of the optical recording medium containing the intermediate addresses provided within zones. Reference numeral 1 is the groove track, 2 is the land track, 3 is the intermediate address, and 4 is the recording area.

Here, each intermediate address 3 is formed from a pair of address pits 3a and 3b shifted relative to each other by a half track pitch in the radial direction. In the figure, the address pits are shown as being rectangular in shape, though they are actually elliptical in shape. In an alternative embodiment, the address section may be formed, not from such a pair of address pit sequences, but from address pit sequences not shifted in the radial direction. In that case, the center of the address section is taken at the center position of the address pits in the radial direction.

A first feature of the intermediate address 3 of this embodiment is that one address is reproduced from both the groove track 1 and the land track 2, and that since there are two addresses on both sides of each track, high reliability can be provided during address demodulation.

A second feature is that the center position of the recording track can be accurately obtained from the reproduced signals of the address pits 3a and 3b located on the left and right sides. More specifically, by comparing the amplitudes of the signals reproduced from the address pits 3a and 3b, and by performing control so that the reproduced signals from the two addresses become equal in amplitude, tracking servo that follows the track center becomes possible. Because of these two features, the intermediate address 3 is used for land/groove recording.

However, when reproduced signals from a recording medium manufactured using the above-configured substrate were closely measured, a phenomenon was observed in which the relative positional relationship between the center of the guide groove and the center position of the intermediate address was displaced between the starting position (radially inward position) and the end position (radially outward position) of each of the plurality of zones arranged in the radial direction.

More specifically, this phenomenon means that the condition under which the amplitudes of the reproduced signals from the intermediate addresses become equal, relative to the center position of the tracking error signal, greatly varies in boundary portions of each zone.

If the center position of the intermediate address is expressed in terms of the positional displacement from the center position of the guide groove, a reproduced signal of the polarity that occurs when the entier intermediate address is shifted toward the inner diameter is obtained at the starting position of the zone while, at the center of the zone, it coincides with the center of the guide groove and, at the end position of the zone, a reproduced signal of the polarity that occurs when the intermediate address is shifted toward the outer diameter is obtained.

As a result, when tracking control is performed by obtaining the track center from the intermediate address, as described above, at the starting position of the zone as well as at the end position of the zone, the tracking servo operates in an off track condition, thus tracking a position displaced from the center of the guide groove.

If signal recording is performed in this condition, there arises the problem that not only does the quality of the signal itself degrade, but also the signal is prone to crosstalk from adjacent tracks, making stable recording and reproduction difficult.

SUMMARY OF THE INVENTION

The present invention is devised to solve the above problem of the prior art, and an object of the invention is to provide an optical recording medium that can reduce the displacement that occurs between the center position of the guide groove and the center position of the intermediate address within each zone, and also to provide a production method and apparatus that achieve such an optical recording medium.

One aspect of the present invention is a substrate for an optical recording medium, comprising:

a plurality of recording tracks formed at least in guide grooves on a disc; and an address section comprising an address pit sequence formed between said recording tracks in said guide grooves along an information reading direction of said recording tracks, and wherein:

said recording tracks in said guide grooves are divided into a prescribed number of zones, and in each of said zones, the center of said address section corresponding at least to the recording track in the radially outermost or radially innermost guide groove is disposed so as to shift in a radial direction of said disc in relative relationship to the center of said recording track in said guide groove.

Another aspect of the present invention is the substrate for an optical recording medium, wherein said address section comprises a pair of intermediate addresses located at positions shifted relative to each other in the radial direction of said disc, and the center of said address section is represented by a center line extending between center axes of said intermediate addresses.

Still another aspect of the present invention is the substrate for an optical recording medium, wherein the direction of shift of the center of said address section is reversed between the shift relative to the radially outermost recording track and the shift relative to the radially innermost recording track in the same zone.

Yet another aspect of the present invention is the substrate for an optical recording medium, wherein the amount of shift of the center of said address section decreases continuously or in a steplike manner within said each zone from the radially outermost or innermost portion of said each zone toward the center thereof.

Still vet another aspect of the present invention is the substrate for an optical recording medium, wherein said substrate is used to produce an optical recording medium in accordance with a prescribed production method, and wherein the amount and direction of shift of the center of said address section are determined so as to offset the amount and direction of shift of the center of said address section that appear in a signal reproduced from said optical recording medium when said optical recording medium is produced by said production method using a calibration substrate on which the amount of shift of the center of said address section is set to zero.

A further aspect of the present invention is an optical recording medium comprising a phase change type thin film recording layer formed on an upper surface of the substrate for an optical recording medium.

A still further aspect of the present invention is the optical recording medium, wherein said phase change type thin film recording layer is initialized in advance.

A yet further aspect of the present invention is a master disc used to produce the substrate for an optical recording medium, wherein portions corresponding to said guide grooves and said address section are formed on a glass master disc having a photoresist layer.

A still yet further aspect of the present invention is the master disc recording apparatus for producing the master disc used to produce the substrate for an optical recording medium, said apparatus comprising:

a light source for photographically exposing said photoresist layer on said glass master disc;

an optical modulator for optically modulating light of said light source in accordance with an address signal; and a deflector for deflecting said optically modulated light, wherein;

said deflector is an EO deflector which deflects said optically modulated light in such a manner that (a) in an area for said recording tracks, parallel or wobbled guide grooves are formed, and that (b) in an area for said address section, a beam of said light is shifted in the radial direction of said master disc so that, in said each zone, the center of said address section corresponding at least to the recording track in the radially outermost or radially innermost guide groove shifts in the radial direction of said disc in relative relationship to the center of said recording track in said guide groove.

An additional aspect of the present invention is a master disc recording apparatus for recording information on the master disc used to produce the substrate for an optical recording medium, said apparatus comprising:

a light source for photographically exposing said photoresist layer on said glass master disc;

an optical modulator for modulating light of said light source in accordance with an address signal; and a first EO deflector for deflecting a beam of said optically modulated light in synchronism with timing of said address signal, and thereby forming said address section by making the center of said address section coincide with the center of said recording track in said guide groove; and a second EO deflector for accepting the light output from said first EO deflector, and for applying an offset by deflecting said light beam in the radial direction of said master disc in such a manner that (a) in an area for said recording tracks, said guide grooves are formed so as to wobble along the direction of said address pit sequence, and that (b) in an area for said address section, in said each zone the center of said address section corresponding at least to the recording track in the radially outermost or radially innermost guide groove shifts in the radial direction of said disc in relative relationship to the center of said recording track in said guide groove.

A still additional aspect of the present invention is the master disc recording apparatus, wherein the direction in which said light is deflected by said second EO deflector in said address section is reversed between the deflection relative to said radially outermost recording track and the deflection relative to said radially innermost recording track in the same zone.

A yet additional aspect of the present invention is the master disc recording apparatus, wherein the amount of deflection applied by said second EO deflector in said address section decreases continuously or in a steplike manner within said each zone from the radially outermost or innermost portion of said each zone toward the center thereof.

A still yet additional aspect of the present invention is the master disc recording apparatus for recording information on a master disc used to produce a substrate for an optical recording medium, wherein said substrate is used to produce an optical recording medium in accordance with a prescribed production method, and wherein the amount and direction of said light beam deflection applied by said second EO deflector are determined so as to be able to offset the amount and direction of shift of the center of said address section that appear in a signal reproduced from said optical recording medium when said optical recording medium is produced by said production method using a calibration substrate on which the amount of shift of the center of said address section is set to zero.

A supplementary aspect of the present invention is a signal generating apparatus, used in the master disc recording apparatus, for generating a signal for driving said EO deflector, wherein said signal generating apparatus supplies said optical modulator with a binary signal corresponding to said address signal, and supplies said EO deflector with (a) in the case of said recording track area, a voltage for forming parallel or wobbling guide grooves, and (b) in the case of said address section area, a shift voltage for deflecting said optically modulated light in such a manner as to shift said light beam in the radial direction of said master disc so that, in said each zone, the center of said address section corresponding at least to the recording track in the radially outermost or radially innermost guide groove shifts in the radial direction of said disc in relative relationship to the center of said recording track in said guide groove.

A still supplementary aspect of the present invention is a signal generating apparatus, used in the master disc recording apparatus, for generating signals for driving said first EO deflector and said second EO deflector, wherein said signal generating apparatus supplies said optical modulator with a binary signal corresponding to said address signal, supplies said first EO deflector with a voltage for deflecting said optically modulated light beam in synchronism with the timing of said address signal, and thereby making the center of said address section coincide with the center of said recording track in said guide groove; and supplies said second EO deflector with an offset voltage for deflecting said light beam in the radial direction of said master disc in such a manner that (a) in said recording track area, said guide grooves are formed so as to wobble along the direction of said address pit sequence, and that (b) in said address section area, in said each zone the center of said address section corresponding at least to the recording track in the radially outermost or radially innermost guide groove shifts in the radial direction of said disc in relative relationship to the center of said recording track in said guide groove.

A yet supplementary aspect of the present invention is the signal generating apparatus, wherein the polarity of said shift voltage supplied to said EO deflector or said second EO deflector is reversed between the voltage for said radially outermost recording track and the voltage for said radially innermost recording track in the same zone.

A still yet supplementary aspect of the present invention is the signal generating apparatus, wherein the polarity of said shift voltage supplied to said EO deflector or said second EO deflector decreases continuously or in a steplike manner within said each zone from the radially outermost or innermost portion of said each zone toward the center thereof.

Another aspect of the present invention is the signal generating apparatus used in a master disc recording apparatus for recording information on a master disc used to produce a substrate for an optical recording medium, wherein said substrate is used to produce an optical recording medium in accordance with a prescribed production method, and wherein the magnitude and polarity of said shift voltage supplied to said EO deflector or said second EO deflector are determined so as to offset the amount and direction of shift of the center of said address section that appear in a signal reproduced from said optical recording medium when said optical recording medium is produced by said production method using a calibration substrate on which the amount of shift of the center of said address section is set to zero.

DESCRIPTION OF SYMBOLS

1. GROOVE TRACK
1c. TRACK CENTER
2. LAND TRACK
3. INTERMEDIATE ADDRESS
3c. CENTER OF INTERMEDIATE ADDRESS
4. RECORDING AREA
21. MASTER DISC
23. LIGHT SOURCE
24, 27, 30. MIRROR
25. EO MODULATOR
26. FORMAT CONTROLLER
28. FIRST EO DEFLECTOR
29. SECOND EO DEFLECTOR
45. OFFSET VOLTAGE GENERATING CIRCUIT
d1, d2. DISPLACEMENT

PREFERRED EMBODIMENTS OF THE INVENTION

A substrate, an optical recording medium, and a recording and reproducing apparatus according to the present invention will be described below with reference to drawings.

The positional displacement that occurs between the center of the guide groove and the center of the address section in zone boundary portions, as earlier described, is not pronounced on the substrate itself, but is believed to occur during the recording layer formation and subsequent processing steps.

In view of this, in the present invention, an optical recording medium is produced through various steps by using a calibration substrate fabricated in accordance with a prior known method, and the amount of radial positional displacement between the address section and the guide groove is measured on the completed medium. Next, based on the amount of positional displacement at each radial position obtained as the result of the measurement, the address section is formed on a substrate at a position displaced in a direction opposite to the direction of the positional displacement, thereby obtaining the address section and guide groove free from positional displacements in the completed optical recording medium.

The optical recording medium to which the present invention is applied is circular in shape, and a guide groove used as a guide for tracking when recording an information signal and address pits interrupting portions of the guide groove are formed on a surface of the medium. The ZCAV (zoned constant angular velocity) format is used for the arrangement of the address pits, and the tracks are each divided in the circumferential direction into a plurality of sectors, and are grouped into zones along the radial direction, the format being such that the number of sectors gradually increases toward the outer diameter of the medium.

Figure 1:
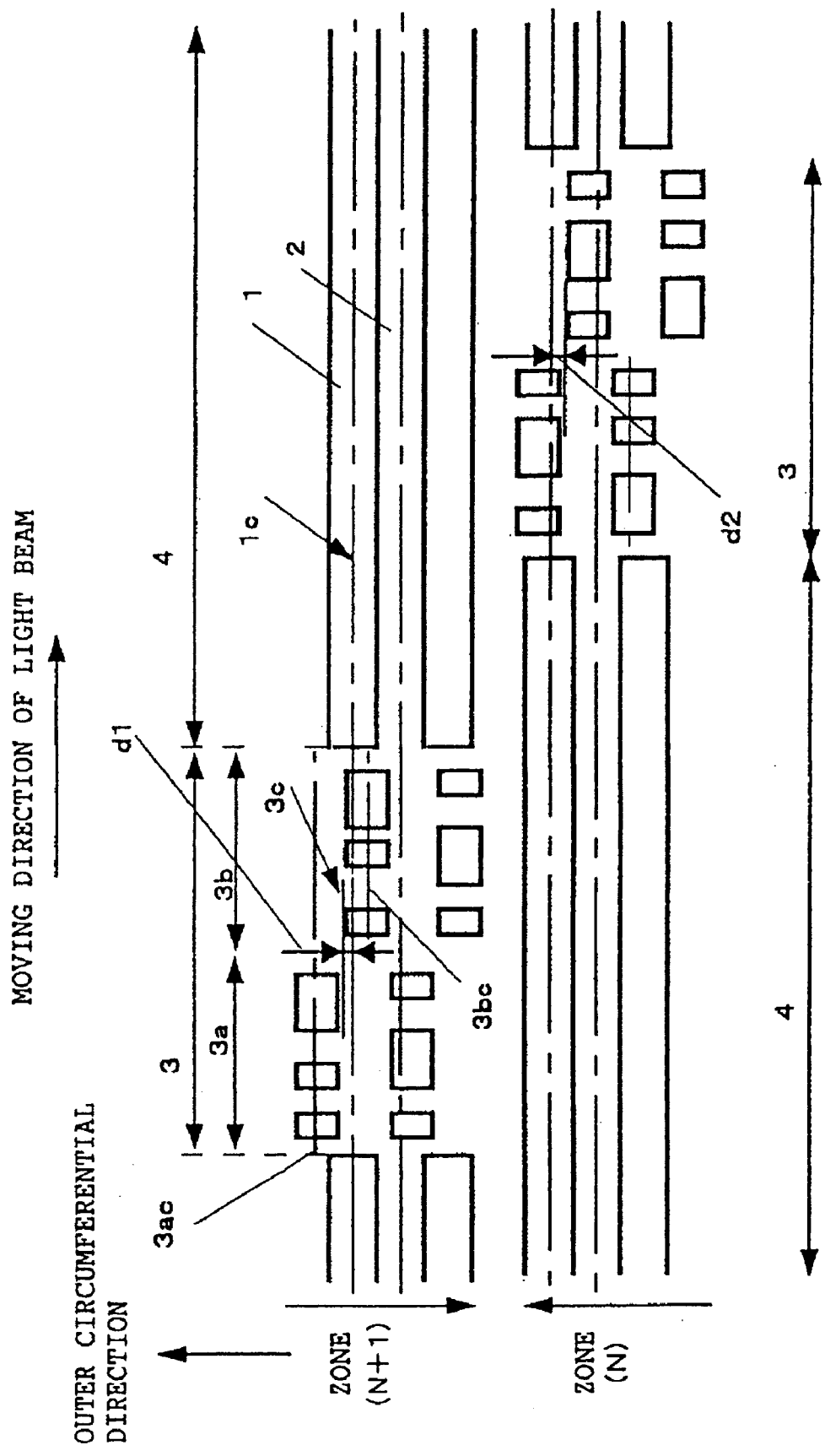
FIG. 1 is a schematic diagram showing the format of a substrate for an optical recording medium according to one embodiment of the present invention.

FIG. 1 is a diagram showing the arrangement of the guide grooves and address sections in a zone boundary portion on the substrate for the optical recording medium of the present invention. In the figure, raised and recessed portions of the guide grooves are respectively recording tracks forming a recording area 4 and consisting of groove tracks 1 and land tracks 2.

The address section comprises an intermediate address 3 formed at positions shifted left and right relative to the center position of each recording track. The position of the intermediate address is displaced by approximately a half track pitch relative to the center 1c of the groove track or the center 2c of the land track. The intermediate address consists of a first address pit sequence 3a and a second address pit sequence 3b displaced relative to the moving direction of the light beam. A center line 3c passing between the centers 3ac and 3bc of the respective address pits is defined as the center line of the intermediate address. The center line of the intermediate address, for the groove track 1, is the center line between the first address pit sequence located radially outward and the second address pit sequence located radially inward and, for the land track, is the center line between the first address pit sequence located radially inward and the second address pit sequence located radially outward.

In the present invention, the relative positional relationship of the center line of the intermediate address relative to the track center of the guide groove is varied along the radial direction in each zone.

FIG. 1 illustrates the sector arrangement at the boundary between zone (N) and zone (N+1) and shows the end position of the zone (N) and the starting position of the zone (N+1). Here, the amount of displacement of the center line of the intermediate address relative to the center line of the guide groove is defined as d. In the zone starting position, that is, in the area of the zone (N+1) in the figure, the intermediate address is arranged so that its center line 3c is shifted radially outward by the amount of shift, d1, relative to the track center 1c of the guide groove. In the zone end position, that is, in the area of the zone (N) in the figure, the center line of the intermediate address is shifted radially inward by the amount of shift, d2, relative to the center of the guide groove.

Figure 2:
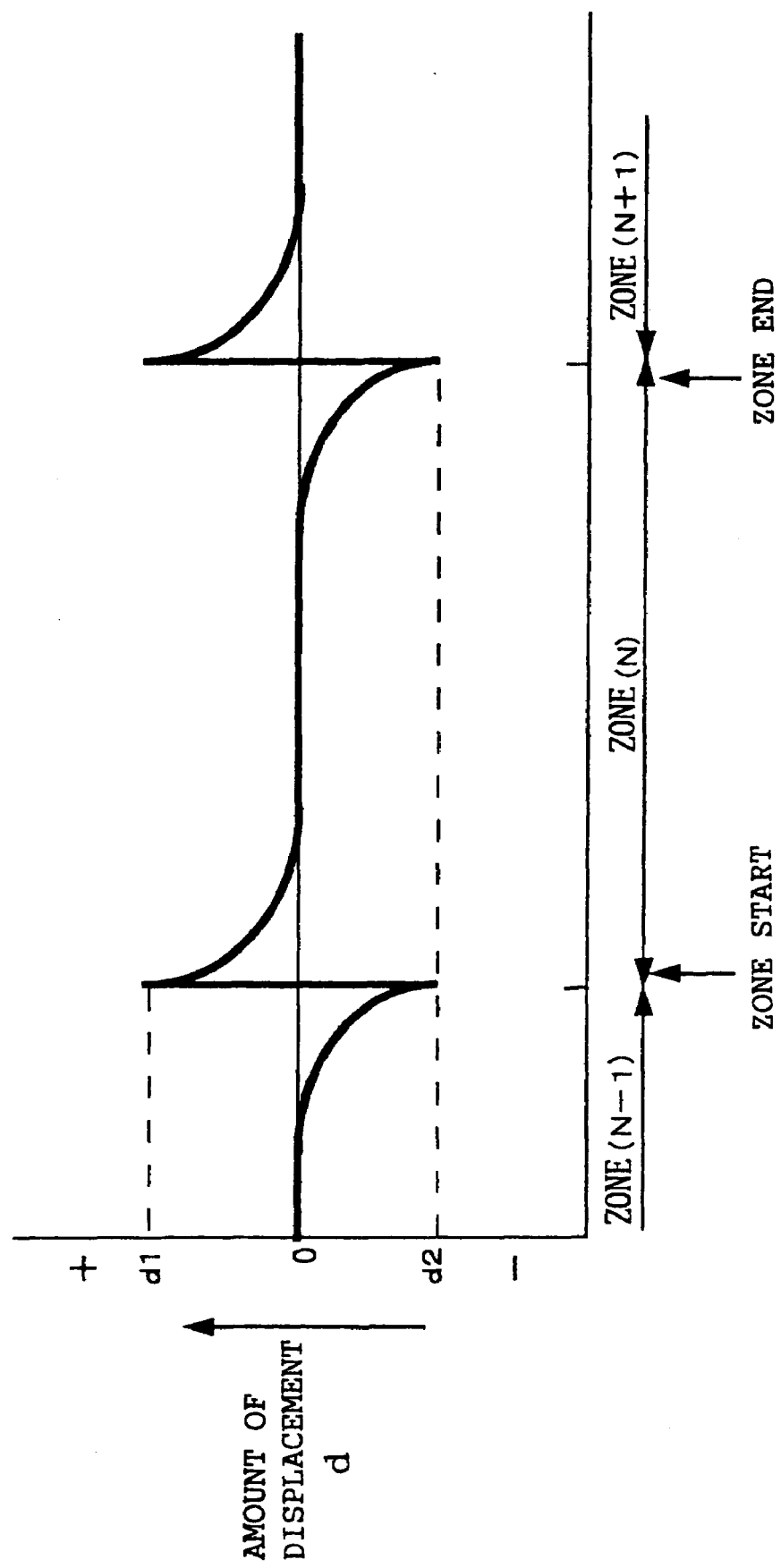
FIG. 2 is a diagram showing the dependence on the zone position, of the amount of displacement of an intermediate address according to the present invention.

FIG. 2 is a diagram showing the amount of positional displacement, d, of the center line of the intermediate address relative to the center of the guide groove in the radial direction of the recording medium. At the zone start position, the center line is shifted radially outward (the positive direction) by d1, the amount of shift gradually decreasing toward the center of the zone until it reaches zero at the center; the center line is then shifted radially inward (the negative direction), the amount of shift gradually increasing toward the end of the zone at which the amount of shift is d2.

The value, d, of the amount of shift of the intermediate address relative to the center position of the guide groove is determined as follows. That is, an optical recording medium is produced through a prescribed series of production steps including the recording material layer deposition step, laminating step, and initializing step, by using a calibration substrate fabricated in accordance with a prior known method in which the amount of shift, d, which is a feature of the present invention, is set to zero.

In each zone of the completed optical recording medium, the amount of displacement between the center of the guide groove and the center line of the intermediate address is measured. Then, a substrate corresponding to FIG. 2 is fabricated by using the same steps as the prescribed production steps, but by shifting the center line in the opposite direction by an amount equal to the measured amount of shift.

Here, the amount of displacement between the center of the guide groove and the center line of the intermediate address is a value obtained from the difference between the position coinciding with the center position of the amplitude of the tracking error signal and the position where the amplitudes of the pair of reproduced signals of the intermediate address match.

With the above arrangement, the amount of displacement between the center position of the guide groove and the center line of the intermediate address, which occurs during the production process of the optical recording medium, can be corrected so that the center position of the intermediate address matches the center line of the guide groove on the finally completed optical recording medium. As a result, off tracking that occurs during control when the recording medium is tilted in the radial direction can be corrected by a track centering servo using the intermediate address, thus achieving stable recording and reproduction.

Figure 3:
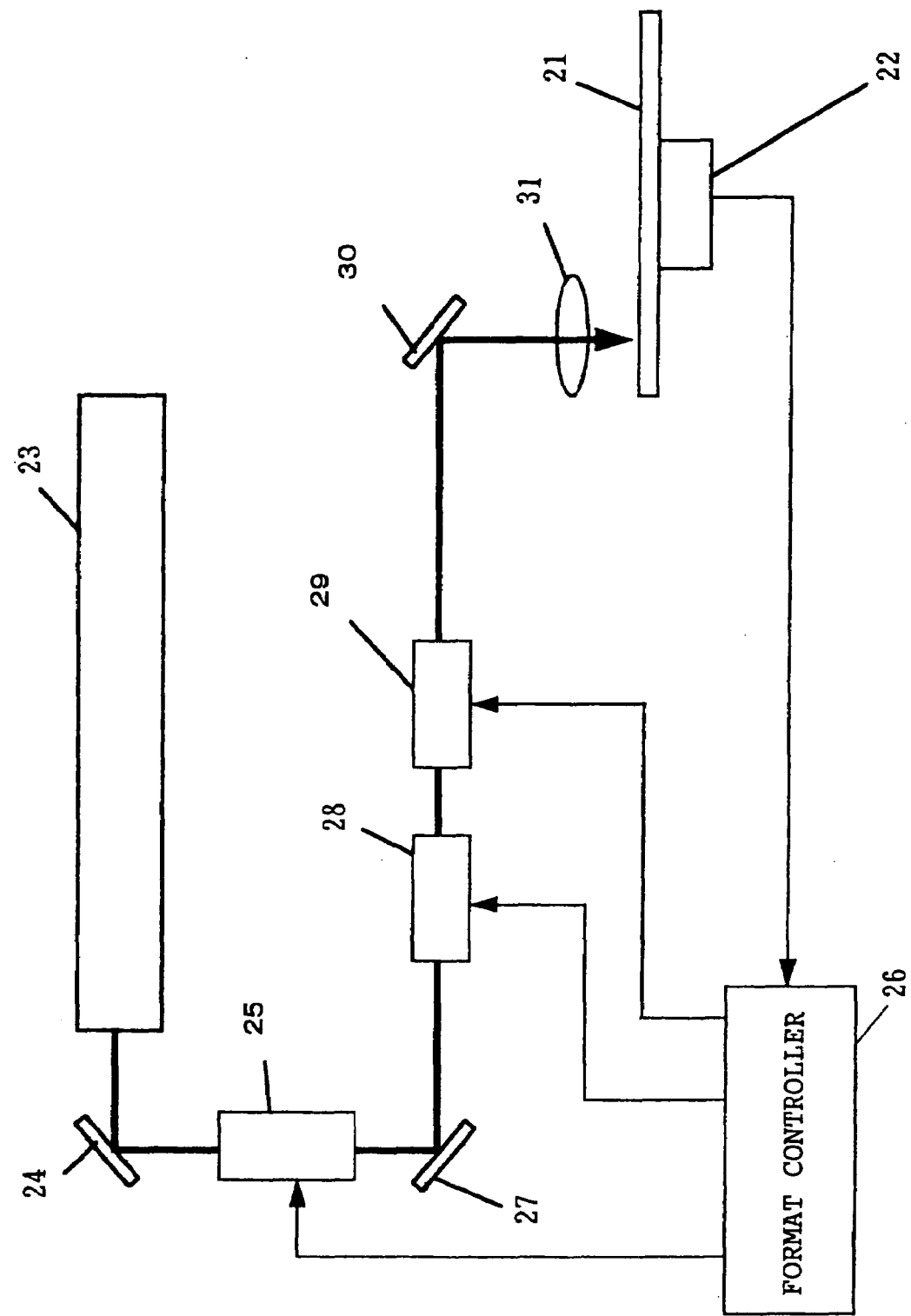
FIG. 3 is a block diagram showing the configuration of a master disc recording apparatus according to the present invention.

Next, a master disc recording apparatus for producing a master disc used to obtain a substrate for an optical recording medium according the present invention will be described with reference to the block diagram of FIG. 3. In FIG. 1, the guide grooves in the recording area (region) were shown as being parallel guide grooves, but in the embodiment shown in FIGS. 3 and 4, the guide grooves in the recording area (region) are formed as wobbled grooves.

A glass master disc 21 whose surface is coated with a photoresist layer is rotated by a spindle motor 22. A light beam emitted from a recording light source 23 for photographically exposing the photoresist layer is reflected by a mirror 24, and enters an EO modulator (an electro-optical device) 25. The EO modulator 25 intensity modulates the entering light beam by a modulating signal corresponding to the address signal supplied from a format controller 26 which controls the entire mastering apparatus.

Next, the light beam exiting the EO modulator 25 is reflected by a second mirror 27 into a first EO deflector 28 where the light beam is deflected in accordance with a control voltage from the format controller 26 for causing the intermediate address to shift in position in the track direction by an amount equal to a half track pitch. The first EO deflector 28 operates in the address section area, but does not operate to deflect in the recording area. The EO deflector of the present invention corresponds to this first EO deflector.

Next, a second EO deflector 29 deflects the light beam in accordance with a wobble voltage from the format controller 26 for causing the guide groove to wobble with a prescribed frequency.

The light beam from the second EO deflector 29 is reflected by a third mirror 30, and is focused by an objective lens 31 into a microscopic spot which is trained on the photoresist layer on the surface of the glass master disc 21.

Though details are not shown in the figure, this recording system is equipped with a focus control system that uses an auxiliary beam to keep the distance between the objective lens 31 and the glass master disc 21 constant.

Figure 4:
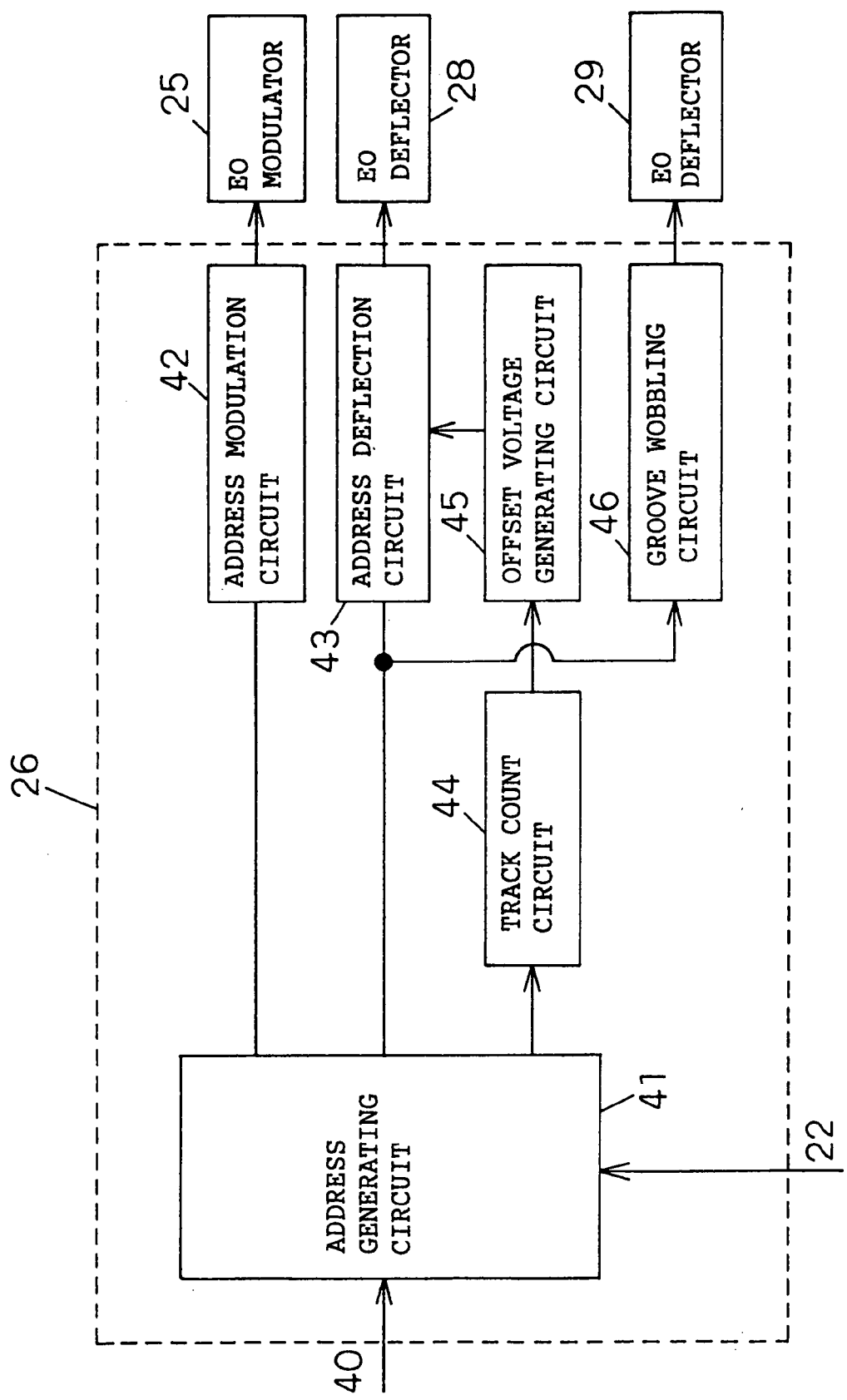
FIG. 4 is a block diagram showing the configuration of a format controller according to the present invention.

FIG. 4 is a diagram showing the details of the format controller 26 which generates control signals for controlling the light beam in the master disc recording apparatus. The operation of the format controller 26 will be described below with reference to the same figure. Recording starts in response to a recording start signal from an external controller; first, a coded address signal is generated by an address generating circuit 41 at timing synchronized to a rotational position indicating signal being output from the spindle motor 23, and a modulating signal is output to the EO modulator 25 via an address modulator 42.

From an output of a track count circuit 44 counting the number of tracks within the zone indicated by the address signal from the address generating circuit 41, an offset voltage circuit 45 determines a position within the zone and, based on the result of the determination, generates an offset voltage which is supplied to an address deflector 43.

In accordance with a timing signal synchronized to the address modulating signal output from the address signal generator 41, the address deflection circuit 43 generates a first deflection signal for shifting the first address pit sequence and the second address pit sequence, one to the left and the other to the right, by an equal distance from the center of the guide groove in synchronism with the timing of the corresponding modulating signal, and supplies to the first EO deflector 28 a signal created by superimposing the first deflection signal on the output voltage of the offset voltage circuit 45.

Figure 5:
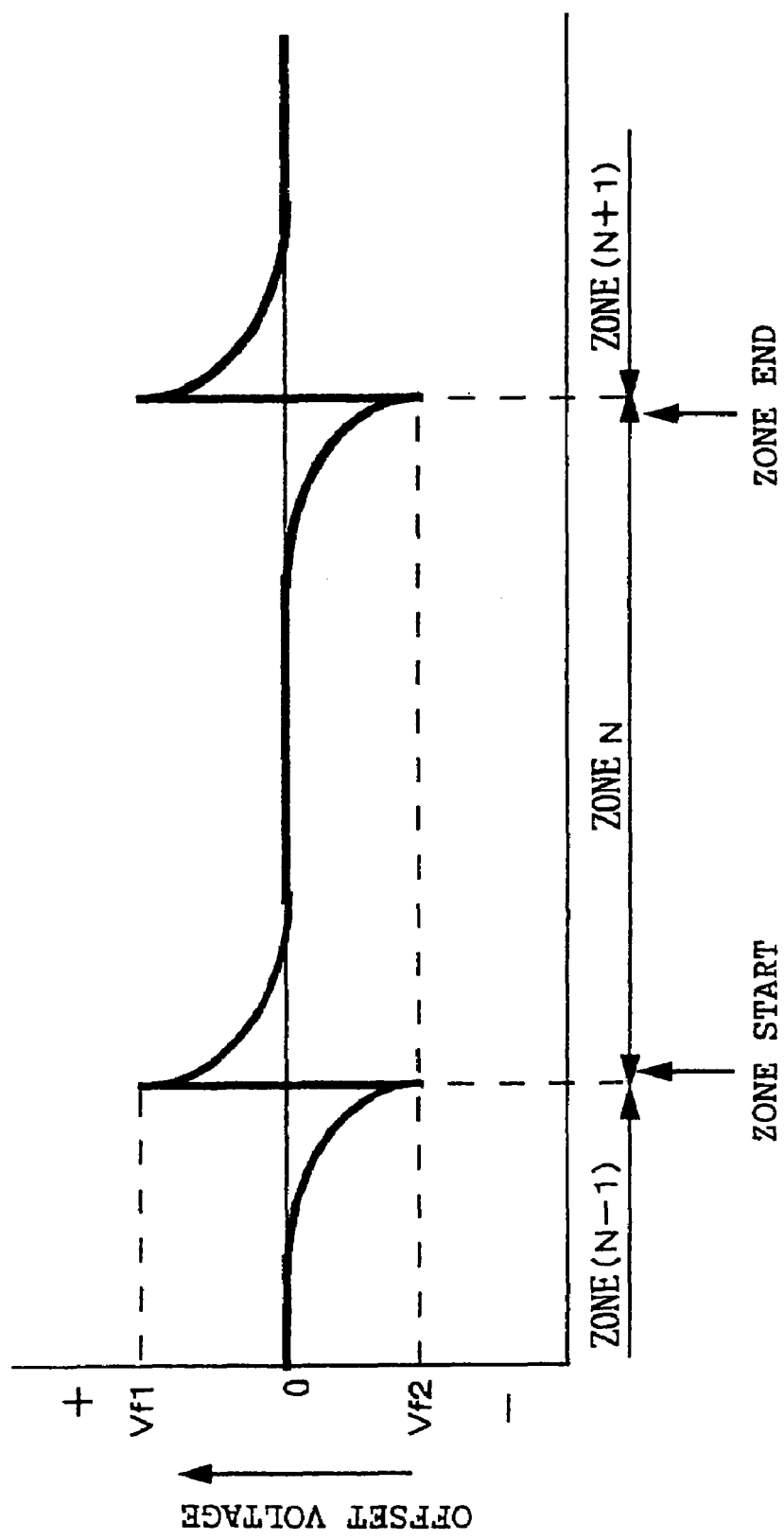
FIG. 5 is a diagram showing the dependence on the zone position, of an offset voltage applied to an EO deflector according to the present invention.

FIG. 5 shows the dependence of the output voltage of the offset voltage circuit 45 on the radial position. At the zone starting position where the zone (N) starts, a positive offset voltage Vf1 is generated, and the offset voltage is gradually lowered toward the center of the zone, until it decreases to zero at the center of the zone. In the zone end portion, a negative offset voltage is applied, and at the end of the zone, a negative offset voltage Vf2 is generated.

In the illustrated example, the offset voltage is continuously varied over the entire range of the zone, but instead, the offset voltage may be varied in steps, one step at a time for every prescribed number of tracks, for example, 20 tracks. In this case, the offset voltage circuit can be simplified.

Further, for different zones it is preferable to set the offset voltage for each zone, based on values obtained by measuring the amount of displacement in the center position of the intermediate address on a disc manufactured in accordance with a prior known method in which the condition for the intermediate address is not varied.

However, from the standpoint of simplifying the circuitry of the offset voltage circuit 45, when variations in the amount of shift, among the plurality of split zones, are small, the amount of shift is set to the same value for each zone, that is, in the outside zone (N+1), for example, the offset voltage Vf1 is applied at the zone starting position, zero at the center, and Vf2 at the zone end position, as in the zone (N), as shown in FIG. 5; by so doing, the offset voltage circuit can be simplified.

Figure 6:
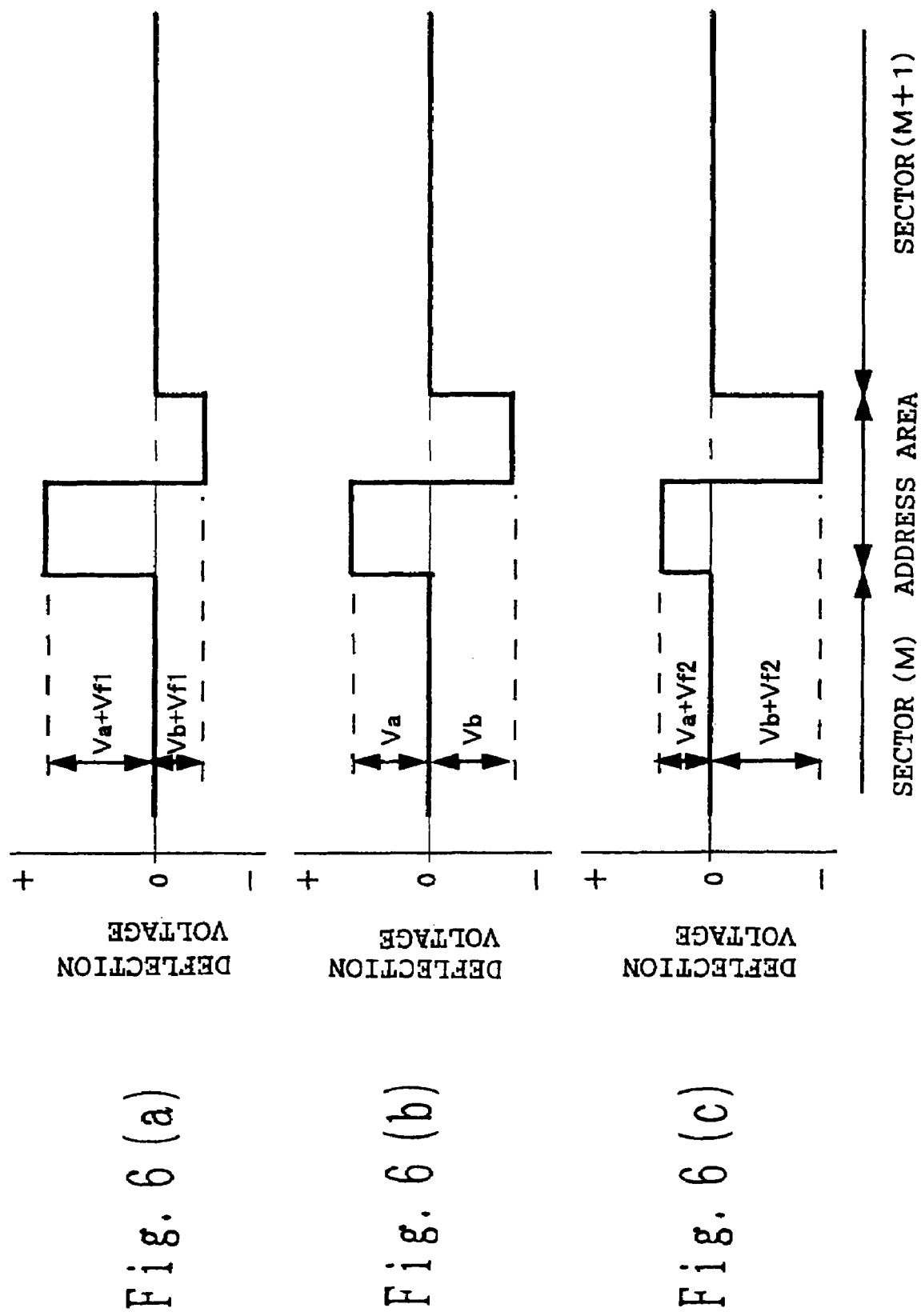
FIG. 6 is a diagram showing the dependence on the zone position, of deflection voltages applied to the EO deflector of the present invention.

FIG. 6 is a diagram showing the waveforms of the deflection signals output from the address deflection circuit 43 in the address area. FIG. 6(b) shows the address deflection voltage in the center portion of the zone; here, since the output from the offset voltage circuit 45 is zero, a voltage is generated that causes shifts to the left and right by an equal distance, i.e., a half track pitch relative to the guide groove, that is, a positive deflection voltage Va is output for the first address pit sequence located forward, and a negative deflection voltage Vb equal in value but opposite in polarity to Va is output for the succeeding second address pit sequence.

FIG. 6(a) shows the zone starting portion where the offset voltage Vf1 is input from the offset voltage circuit and the address deflection circuit 43 outputs a voltage (Va+Vf1) for the first address pit sequence and a voltage (Vb+Vf1) for the second address pit sequence.

On the other hand, FIG. 6(c) shows the zone end portion where the offset voltage Vf2 is input from the offset voltage circuit and the address deflection circuit 43 outputs a voltage (Va+Vf2) for the first address pit sequence and a voltage (Vb+Vf2) for the second address pit sequence. Here, when the deflection voltage is positive, the light beam moves relative to the glass master disc in the radially outward direction. As a result, in the zone starting portion, the center position of the intermediate address is shifted radially outward, while in the zone end portion, it is formed at a position shifted radially inward.

Next, a second method will be described that corrects the amount of shift of the intermediate address according to the zone position. The second method concerns the case where the guide grooves are wobbled, and noting that the degree of deflection for causing the wobbling and the degree of deflection for causing the above offset are approximately the same and, compared with that, the degree of deflection for generating the pair of address pit sequences is large, the first deflector is used for the address pit sequences and the second deflector connected in series following the first deflector is used for the wobbling and offset purposes. By so doing, low cost deflectors can be used.

Figure 7:
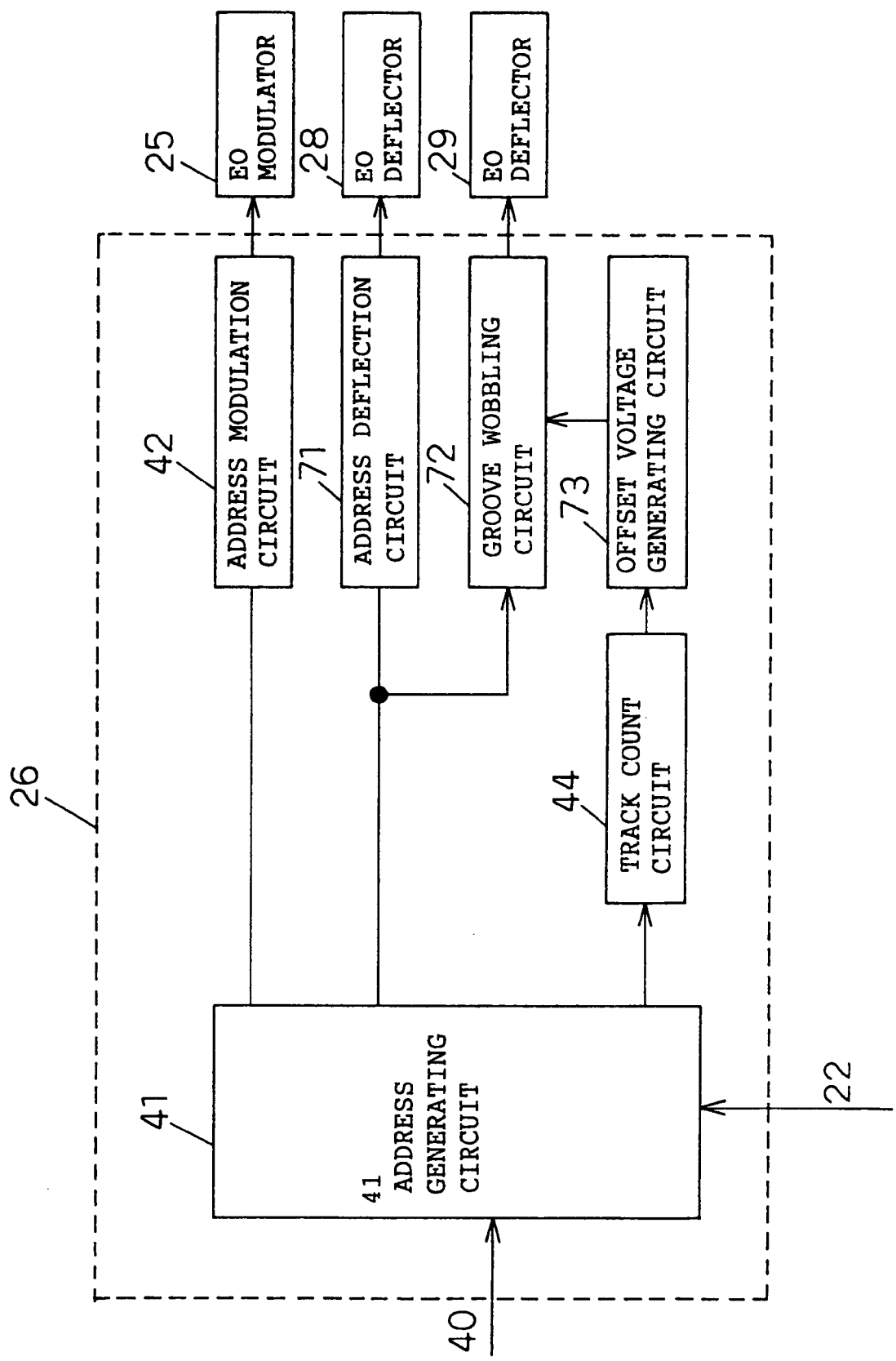
FIG. 7 is a block diagram showing the configuration of a second format controller according to the present invention.

The format controller 26 shown in FIG. 7 is intended to correct the displacement in the intermediate address position by applying an offset to the second EO deflector used for modulating the groove wobble in a wobbled guide groove configuration.

To cause shifts to the left and right by an equal distance relative to the guide groove, for the first address pit sequence and second address pit sequence the address deflection circuit 71 outputs signals, equal in potential difference but opposite in polarity, to the first EO deflector 28 at timing synchronized to the address modulating signal generated by the address signal generator.

Using the track count circuit 44 that counts the number of tracks within the zone indicated by the address signal from the address generating circuit 41, the offset voltage circuit 73 counts the number of tracks within each zone to determine a position within the zone and, based on the result of the determination, generates an offset voltage which is supplied to a groove wobbling circuit 72.

The groove wobbling circuit 72, at timing corresponding to the guide groove, generates a wobble voltage for causing the guide groove to wobble from side to side.

At timing corresponding to the intermediate address area, the groove wobbling circuit 72 applies the output voltage of the offset voltage circuit 73 to the second EO deflector 29.

Figure 8:
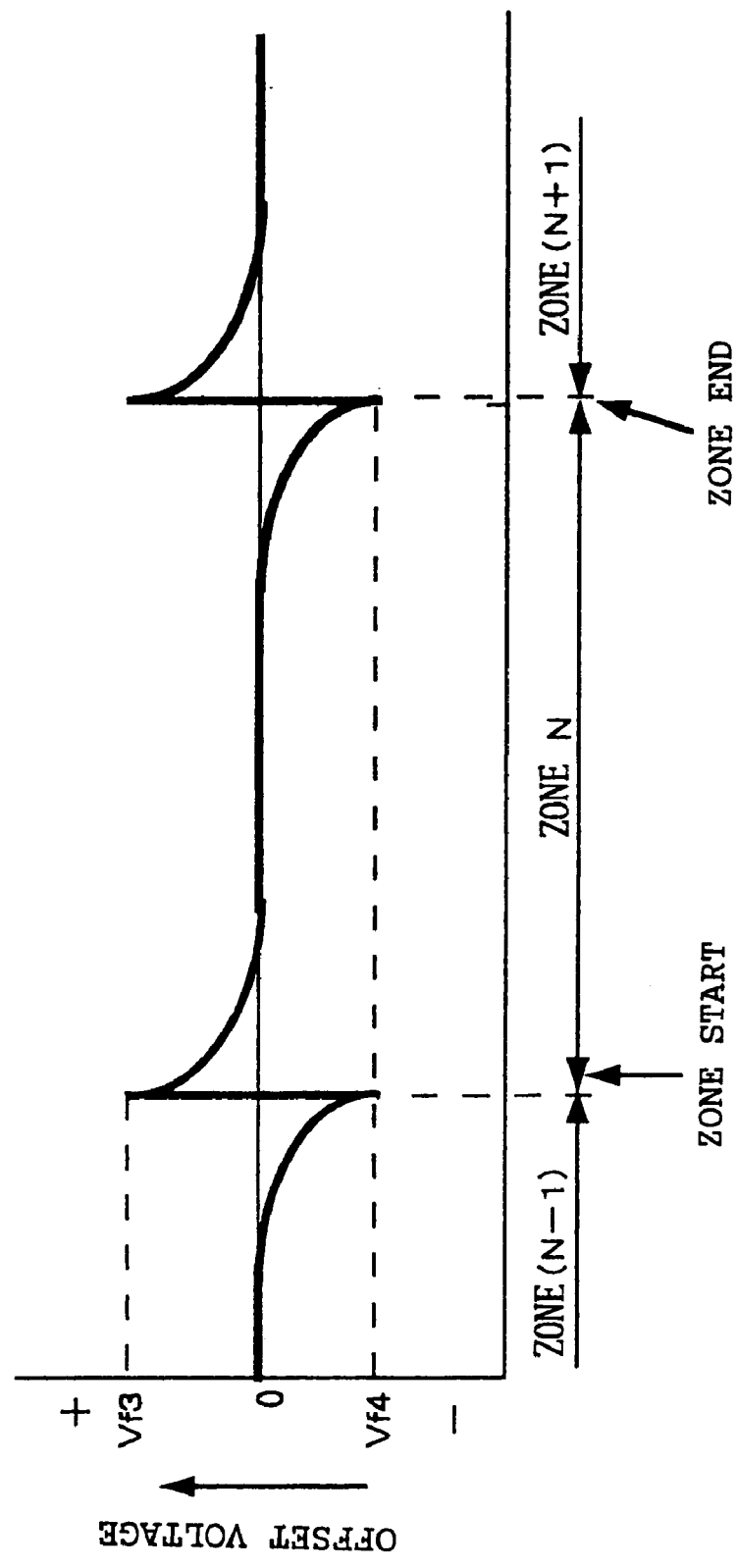
FIG. 8 is a diagram showing the dependence on the zone position, of an offset voltage output from a second offset voltage circuit according to the present invention.

FIG. 8 is a diagram showing the dependence of the output voltage of the offset voltage circuit 73 on the radial position. At the zone starting point, a positive offset voltage Vf3 is generated, and the offset voltage is gradually lowered toward the center of the zone, until it decreases to zero at the center of the zone. In the zone end portion, a negative offset voltage is applied, and at the end of the zone, a negative offset voltage Vf4 is generated.

Figure 9:
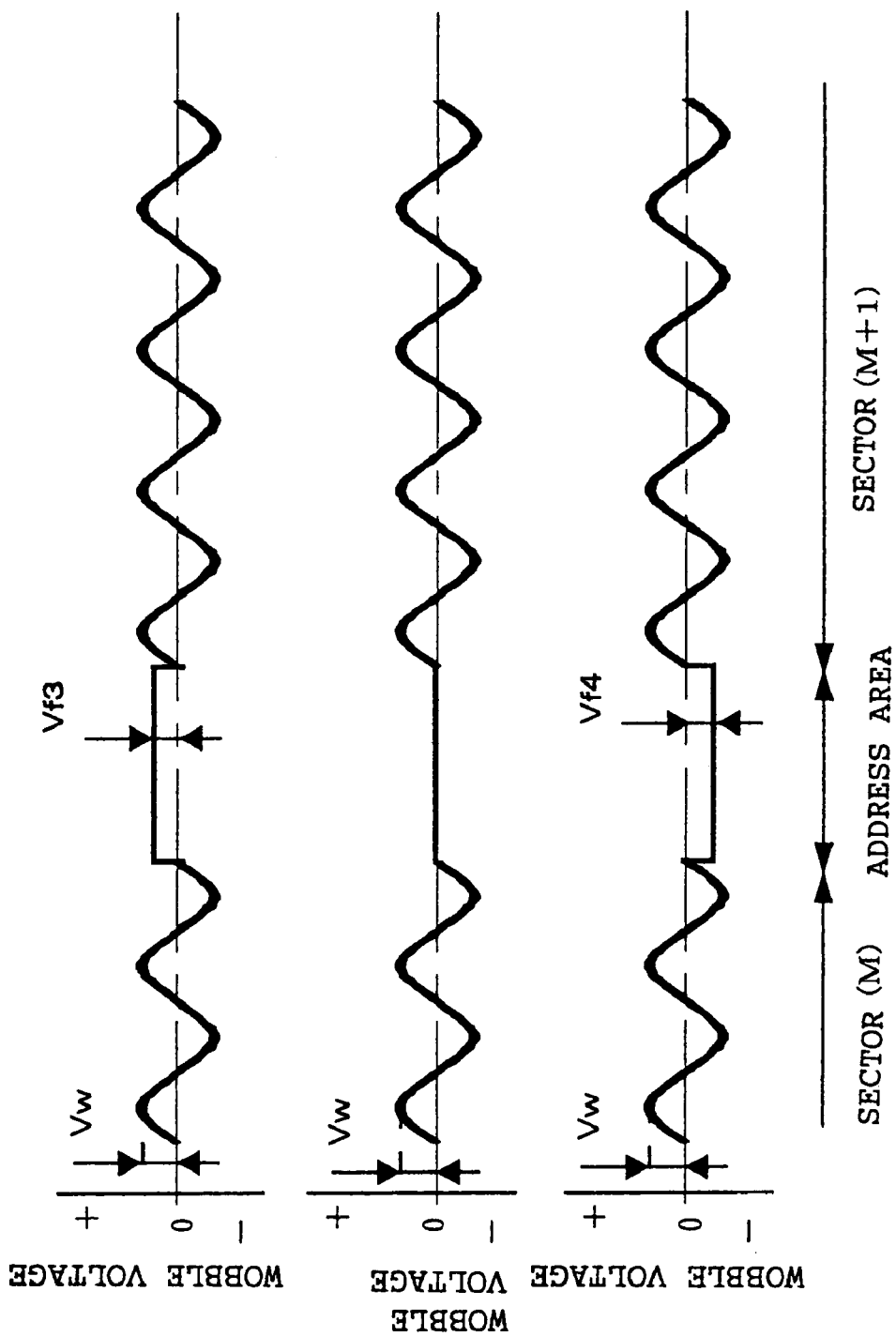
FIG. 9 is a diagram showing the dependence on the zone position, of a wobble voltage output from a groove wobbling circuit according to the present invention.

FIG. 9 is a diagram showing the waveforms of the deflection signals output from the groove wobbling circuit 72 in the address area and its adjacent areas. FIG. 9(*b*) shows the address deflection voltage in the center of the zone; in the area corresponding to the guide groove, a wobble voltage Vw corresponding to the amount of wobble of the guide groove is output, and in the intermediate address area, the voltage is at the zero level since the output from the offset voltage circuit 73 is zero.

FIG. 9(*a*) shows the zone starting portion where the offset voltage Vf3 is input from the offset voltage circuit and the voltage (Vf3) is output in the intermediate address area. On the other hand, FIG. 9(*c*) shows the zone end portion where the offset voltage Vf4 is input from the offset voltage circuit 73 and the groove wobbling circuit 72 outputs the voltage (Vf4) in the intermediate address area. Here, when the deflection voltage is positive, the light beam moves relative to the glass master disc in the radially outward direction. As a result, in the zone starting portion, the center position of the intermediate address is shifted radially outward, while in the zone end portion, it is formed at a position shifted radially inward.

Figure 10:
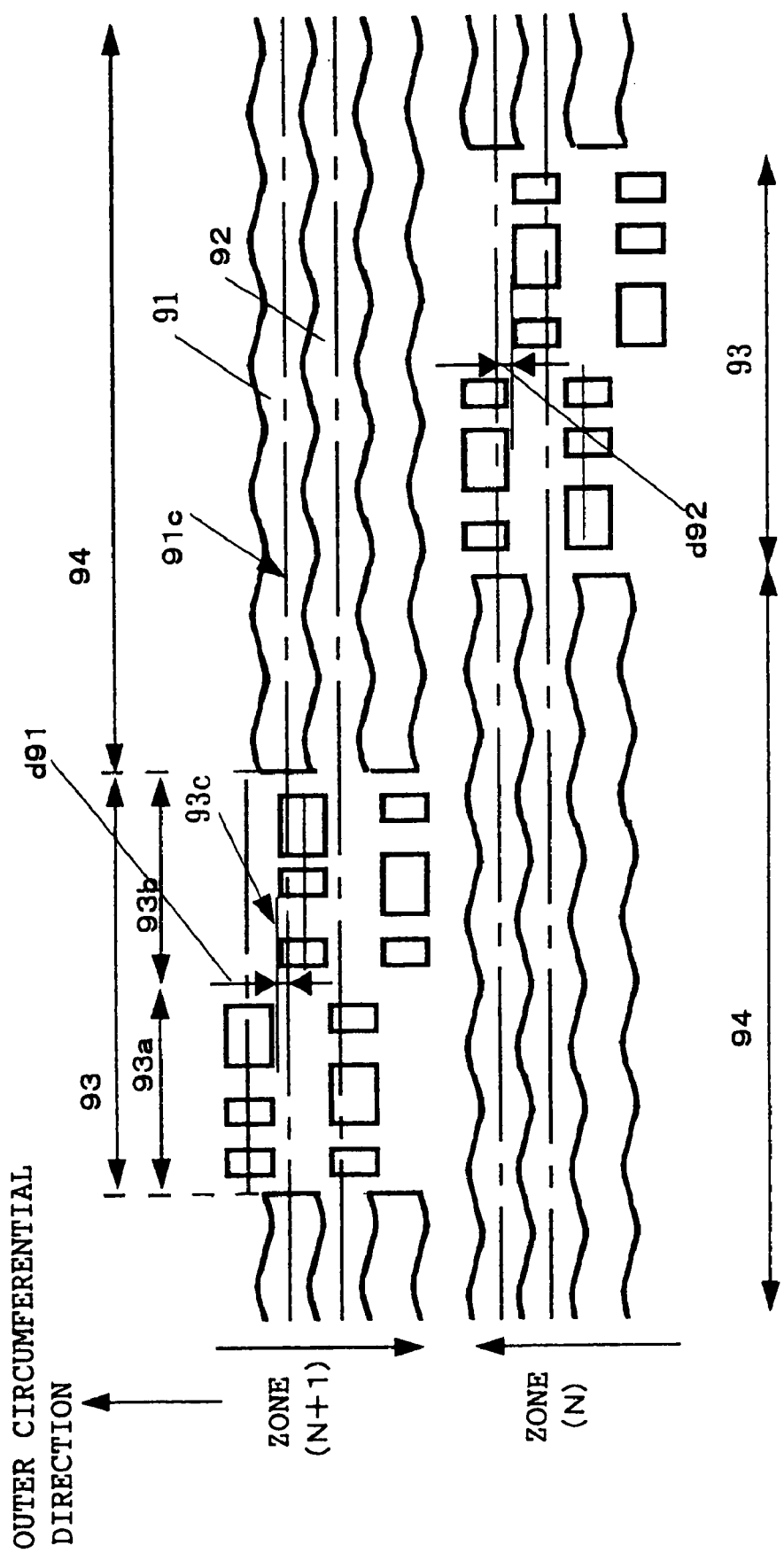
FIG. 10 is a schematic diagram showing the format of a substrate with a wobbled groove configuration for an optical recording medium.
Figure 11:
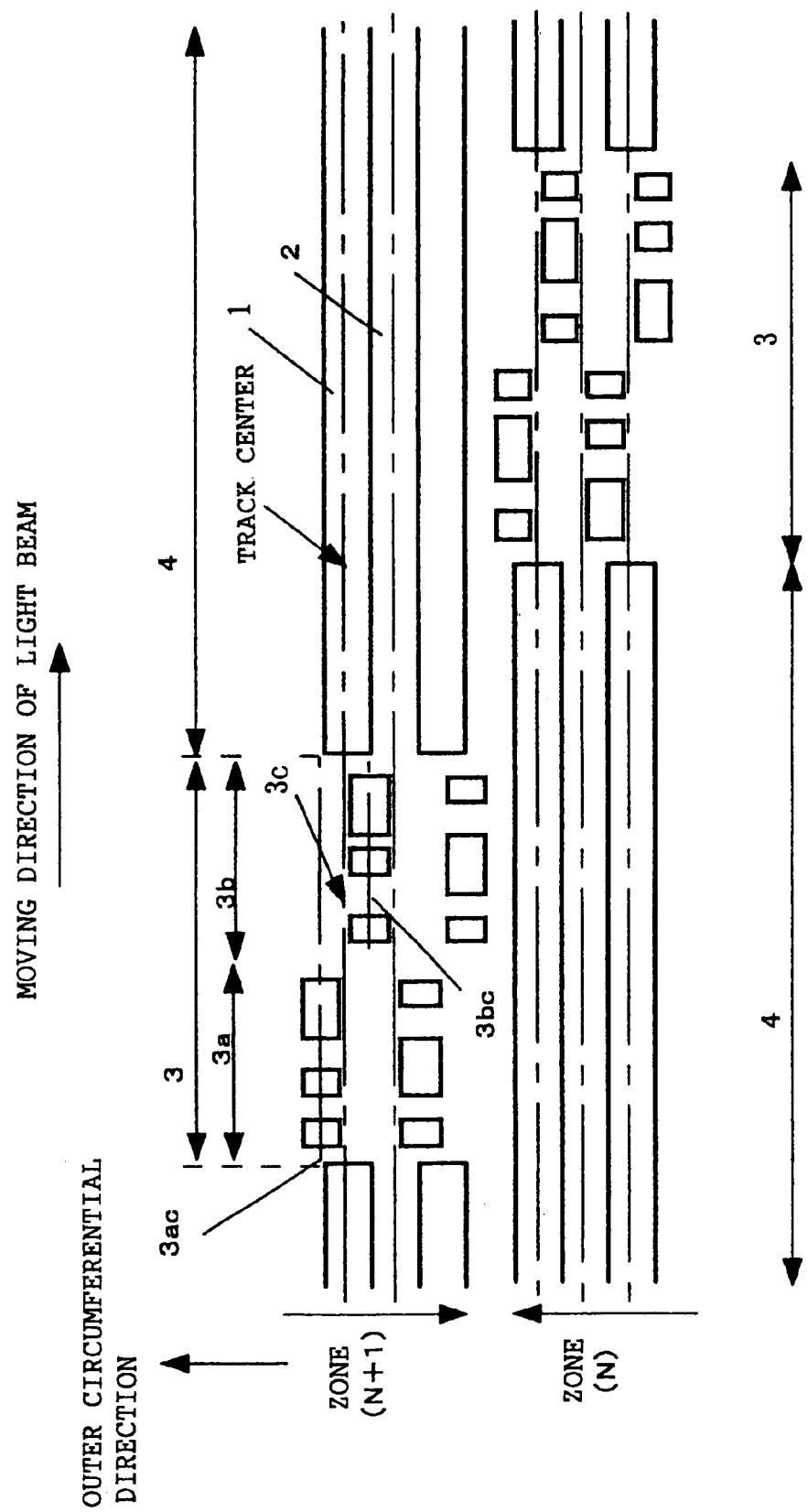
FIG. 11 is a diagram showing the format of a substrate for an optical recording medium.

FIG. 10 is a diagram showing one example of a substrate on which the intermediate address according to the present invention is formed using the circuit shown in FIG. 7 when the substrate is manufactured with a wobbled groove configuration. The difference from FIG. 1 is that the recording tracks, i.e., groove tracks 91 and land tracks 92, are formed as wobbled and the average center line of each track is taken as the track center.

By applying the corrections according to the present invention, in the zone starting portion the center of the intermediate address is shifted by d91 in the radially outward direction and, in the zone end portion, the center is shifted by d92 in the radially inward direction.

With the above arrangement, the guide groove and intermediate address positions within each zone can be corrected by applying an offset voltage to the second deflector for wobbling the guide groove.

In the illustrated example, the offset voltage is continuously varied over the entire range of the zone, but instead, the offset voltage may be varied in steps, one step at a time for every prescribed number of tracks, for example, 20 tracks. In this case, the offset voltage circuit can be simplified.

Further, for different zones, it is preferable to appropriately set the offset voltage for each zone, based on values obtained by measuring the amount of displacement in the center position of the intermediate address on a disc manufactured in accordance with a prior known method in which the condition for the intermediate address is not varied.

However, from the standpoint of simplifying the circuitry of the offset voltage circuit 45, when the difference of the amount of shift between the zones is small, the amount of shift is set to the same value for each zone, that is, in the outside zone (N+1), for example, the offset voltage Vf1 is applied at the zone starting position, zero at the center, and Vf2 at the zone end position, as in the zone (N), as shown in FIG. 5; by so doing, the offset voltage circuit can be simplified.

Next, a description will be given of a process for producing a mold (stamper) used to produce substrates by using the master disc recording apparatus of FIG. 3.

The glass master disc whose surface is coated with photoresist is exposed while controlling the master disc recording apparatus using the two kinds of format controllers described above. Next, after removing the exposed portions by etching, a conductive layer is evaporated on the surface. Further, a metal layer of Ni or the like is formed on the surface by electrocasting or other technique, and the metal layer is separated from it to obtain the mold.

Next, the mold is mounted to an injection molding machine, and a resin material such as polycarbonate or PMMA is injected into it and then separated from the mold; a resin substrate with the guide grooves and intermediate addresses formed on the surface thereof is thus produced.

A recording material layer is formed on the surface of the thus produced substrate by a thin film process such as sputtering or evaporation, and then, a protective cover is provided thereon. Next, in the initializing step, light is irradiated for crystallization, if the recording material layer is a phase change type. With the above process, a recordable phase change recording medium can be obtained.

In one specific example, a $ZnS$—$SiO_2$ dielectric layer, a GeSbTe phase change type thin film recording layer, a $ZnS$—$SiO_2$ dielectric layer, and an Al alloy reflective layer are sequentially formed by sputtering on a substrate of a polycarbonate resin of thickness 0.6 mm having guide grooves of 0.6 ìm track pitch and intermediate addresses formed thereon in accordance with the present invention. Then, a protective cover made of a polycarbonate resin of thickness 0.6 mm is bonded on top of the Al alloy reflective layer by using a UV curable resin layer, and a phase change optical recording medium is thus obtained.

By irradiating a high output laser light of a 100 im long stripe pattern onto the thin film recording layer while the recording medium is being rotated, initialization is performed to effect a change from an amorphous state, which is the state when the material is sputtered, to a crystalline state, to complete the production of the phase change optical recording medium.

If the recording material layer is a magneto-optical recording material, in the initializing step a magnetic field is applied and, in this condition, light is irradiated to orient the magnetization direction in a prescribed direction.

As the result of the above processing, the center of the guide groove coincides with the center of the intermediate address on the optical recording medium produced by the above series of production steps using the substrate shown in FIG. 1 or FIG. 10. As a result, by applying the tracking servo that causes the light beam to track the center position of the intermediate address, stable tracking servo can be achieved even when the substrate or the optical head is tilted.

The above description has been given dealing with the intermediate address provided between the land track and groove track, but the present invention can be applied to any recording media manufactured with guide grooves and address pits and having a configuration such that the number of sectors differs from zone to zone. For example, correction of the center position can also be performed in the same manner as described herein on recording media of a format in which the center of the address pits is arranged so as to match the center of the guide track.

As described above, according to the present invention, the center position of the intermediate address can be made to align with the center of the guide groove on a completed optical recording medium, preventing the track centering servo using the intermediate address from malfunctioning in zone boundary areas, and stable tracking servo can thus be achieved.

What is claimed is:

1. A substrate for an optical recording medium, comprising:
   a plurality of recording tracks formed on a disc; and
   an address section comprising first and second address pit sequences formed between said recording tracks along an information reading direction of said recording tracks,
   said recording tracks divided into a prescribed number of zones,
   each of said recording tracks having a first center line extending along the information reading direction, and
   the first and second address pit sequences each having a respective center axis extending along the information reading direction, the first and second address pit sequences being disposed equidistantly from and on opposing sides of a second center line of said address section, the second center line extending along the information reading direction,
   wherein in each of said zones, the second center line is shifted in a radial direction of said disc, with respect to the first center line to form a predetermined offset, and said second center line is positioned in extension of guide groove contained in each of said recording tracks in which said first center line is provided.

2. The substrate for an optical recording medium according to claim 1, wherein said address section comprises a pair of intermediate addresses located at positions shifted relative to each other in the radial direction of said disc, and
the center of said address section is represented by a centerline extending between center axes of said intermediate addresses.

3. The substrate for an optical recording medium according to claim 1, wherein the direction of shift of the center of said address section is reversed between the shift relative to the radially outermost recording track and the shift relative to the radially innermost recording track in the same zone.

4. The substrate for an optical recording medium according to claim 3, wherein the amount of shift of the center of said address section decreases continuously or in a steplike manner within said each zone from the radially outermost or innermost portion of said each zone toward the center thereof.

5. An optical recording medium comprising a phase change type thin film recording layer formed on an upper surface of the substrate for an optical recording medium as described in any one of claims 1 to 4.

6. The optical recording medium according to claim 5, wherein said phase change type thin film recording layer is initialized in advance.

7. A master disc used to produce the substrate for an optical recording medium as described in claim 1, wherein portions corresponding to said guide grooves and said address section are formed on a glass master disc having a photoresist layer.

8. The master disc recording apparatus for producing the master disc of claim 7 used to produce the substrate for an optical recording medium, said apparatus comprising:
   a light source for photographically exposing said photoresist layer on said glass master disc;
   an optical modulator for optically modulating light of said light source in accordance with an address signal; and
   a deflector for deflecting said optically modulated light, wherein;
   said deflector is an EO deflector which deflects said optically modulated light in such a manner that (a) in an area for said recording tracks, parallel or wobbled guide grooves are formed, and that (b) in an area for said address section, a beam of said light is shifted in the radial direction of said master disc so that, in said each zone, the center of said address section corresponding at least to the recording track in the radially outermost or radially innermost guide groove shifts in the radial direction of said disc in relative relationship to the center of said recording track in said guide groove.

9. A signal generating apparatus, used in the master disc recording apparatus of claim 8, for generating a signal for driving said EO deflector, wherein
   said signal generating apparatus supplies said optical modulator with a binary signal corresponding to said address signal, and
   supplies said EO deflector with (a) in the case of said recording track area, a voltage for forming parallel or wobbling guide grooves, and (b) in the case of said address section area, a shift voltage for deflecting said optically modulated light in such a manner as to shift said light beam in the radial direction of said master disc so that, in said each zone, the center of said address section corresponding at least to the recording track in the radially outermost or radially innermost guide groove shifts in the radial direction of said disc in relative relationship to the center of said recording track in said guide groove.

10. A substrate for an optical recording medium, comprising:
- a plurality of recording tracks formed on a disc; and
- an address section comprising first and second address pit sequences formed between said recording tracks along an information reading direction of said recording tracks,
- said recording tracks divided into a prescribed number of zones,
- each of said recording tracks having a first center line extending along the information reading direction, and
- the first and second address pit sequences each having a respective center axis extending along the information reading direction disposed equidistantly from and on opposing sides of a second center line of said address section, the second center line extending along the information reading direction, wherein in each of said zones, the second center line is shifted in a radial direction of said disc, with respect to the first center line to form a predetermined offset,
- the predetermined offset is a radial shift substantially equal in amount and opposite in direction to a radial shift between third and fourth center lines measured on a calibration substrate,
- the third center line defined by a center of an address section on the calibration substrate, and the fourth center line defined by a center line of a recording track on the calibration substrate.

11. A method for producing a substrate for an optical recording medium, having a plurality of recording tracks formed on a disc comprising the steps of:
- (a) forming an address section having first and second address pit sequences between said recording tracks along an information reading direction of said recording tracks,
- (b) dividing said recording tracks into a prescribed number of zones, each recording track having a first center line extending along the information reading direction, and
- (c) forming the first and second address pit sequences each having a respective center axis extending along the information reading direction, the first and second address pit sequences being disposed equidistantly from and on opposing sides of a second center line of said address section, the second center line extending along the information reading direction and offset from the first center line, wherein said second center line is positioned in extension of a guide groove contained in each of said recording tracks in which said first center line is provided.

12. A method for producing a substrate for an optical recording medium, having a plurality of recording tracks formed on a disc comprising the steps of:
- (a) forming an address section having first and second address pit sequences between said recording tracks along an information reading direction of said recording tracks,
- (b) dividing said recording tracks into a prescribed number of zones, each recording track having a first center line extending along the information reading direction, and
- (c) forming the first and second address pit sequences each having a respective center axis extending along the information reading direction disposed equidistantly from and on opposing sides of a second center line of said address section, the second center line extending along the information reading direction and offset from the first center line,
- (d) determining the amount and direction of the offset using a calibration substrate.

13. A method for producing a substrate for an optical recording medium, having a plurality of recording tracks formed on a disc comprising the steps of:
- (a) forming an address section having first and second address pit sequences between said recording tracks along an information reading direction of said recording tracks,
- (b) dividing said recording tracks into a prescribed number of zones, each recording track having a first center line extending along the information reading direction,
- (c) determining the amount and direction of a calibration offset, and
- (d) forming the first and second address pit sequences each having a respective center axls extending along the information reading direction disposed equidistantly from and on opposing sides of a second center line of said address section, the second center line extending along the information reading direction and offset from the first center line in the same amount and in opposite direction of the calibration offset.

* * * * *

UNITED STATES PATENT AND TRADEMARK OFFICE
CERTIFICATE OF CORRECTION

PATENT NO. : 7,251,202 B2  
APPLICATION NO. : 10/633813  
DATED : August 4, 2003  
INVENTOR(S) : Kenichi Nishiuchi, Shigeaki Furukawa and Tetsuya Akiyama It is certified that error appears in the above-identified patent and that said Letters Patent is hereby corrected as shown below:

Claim 13, column 16, line 39, should read:
--..center axis...--

Signed and Sealed this

First Day of April, 2008

JON W. DUDAS  
*Director of the United States Patent and Trademark Office*

UNITED STATES PATENT AND TRADEMARK OFFICE
CERTIFICATE OF CORRECTION

| | | |
|---|---|---|
| PATENT NO. | : 7,251,202 B2 | Page 1 of 1 |
| APPLICATION NO. | : 10/633813 | |
| DATED | : July 31, 2007 | |
| INVENTOR(S) | : Kenichi Nishiuchi, Shigeaki Furukawa and Tetsuya Akiyama | |

It is certified that error appears in the above-identified patent and that said Letters Patent is hereby corrected as shown below:

Claim 13, column 16, line 39, should read:
--..center axis...--

This certificate supersedes the Certificate of Correction issued April 1, 2008.

Signed and Sealed this

Sixth Day of May, 2008

JON W. DUDAS
*Director of the United States Patent and Trademark Office*